United States Patent
Krompholz et al.

(10) Patent No.: US 6,514,134 B1
(45) Date of Patent: Feb. 4, 2003

(54) METHOD AND APPARATUS FOR THE PRODUCTION OF CHAIN-LIKE FOODSTUFFS SUCH AS SAUSAGES OR THE LIKE

(75) Inventors: Harry Krompholz, Dorverden/Stedorf (DE); Dieter Meier, Kirchlintein (DE)

(73) Assignee: VEMAG Maschinen-und Anlagenbau GmbH, Weserstrasse (DE)

( * ) Notice: Subject to any disclaimer, the term of this patent is extended or adjusted under 35 U.S.C. 154(b) by 0 days.

(21) Appl. No.: 09/698,593

(22) Filed: Oct. 27, 2000

(30) Foreign Application Priority Data

Oct. 29, 1999 (DE) .......................................... 199 52 102

(51) Int. Cl.[7] .............................................. A22C 11/02
(52) U.S. Cl. .......................................... 452/35; 452/30
(58) Field of Search ............................... 452/35, 31, 30

(56) References Cited

U.S. PATENT DOCUMENTS

| | | | |
|---|---|---|---|
| 3,115,668 A | 12/1963 | Townsend | 17/33 |
| 3,404,430 A | 10/1968 | Kielsmeier et al. | 17/45 |
| 4,593,434 A | 6/1986 | Townsend | 17/49 |
| 4,744,129 A | 5/1988 | Weerth | 17/33 |
| 4,944,069 A | * 7/1990 | Townsend et al. | 452/32 |
| 4,972,547 A | * 11/1990 | Townsend et al. | 426/105 |
| 5,512,012 A | * 4/1996 | Lendle et al. | 452/32 |

FOREIGN PATENT DOCUMENTS

| | | |
|---|---|---|
| DE | 1057908 | 5/1959 |
| DE | 2302297 | 1/1973 |
| EP | 0379123 | 7/1990 |
| EP | 0868852 A2 | 10/1998 |
| FR | 1284451 | 2/1962 |

* cited by examiner

Primary Examiner—Charles T. Jordan
Assistant Examiner—Judith Nelson
(74) Attorney, Agent, or Firm—Wood, Herron & Evans, L.L.P.

(57) ABSTRACT

A process and an apparatus for the production of chain-like or concatenated foodstuff products. A pasty filling material is conveyed by a filling pump through a filling tube which is rotatable about its longitudinal axis, and introduced into a tubular case or skin which partially surrounds the filling tube. The filled skin is fed to a portioning device having a plurality of dividing elements. The filled skin is engaged by two dividing elements which are disposed in opposite paired relationship and acted upon by a clamping force. A torque is applied to the skin by the filling tube so that the filled skin is caused to rotate at least in a portion between an exit opening of the filling tube and the portioning device and is locally prevented from rotating by application of the clamping force by the dividing elements, so that a twist-off location is produced. At a location spaced from the twist-off location, a further twist-off location is produced on the filled skin, to produce portioned sausages. The filling material flows into the skin radially at least partially through openings provided in the end region of the filling tube thereby increasing the diameter of the skin.

23 Claims, 7 Drawing Sheets

Figure 1:
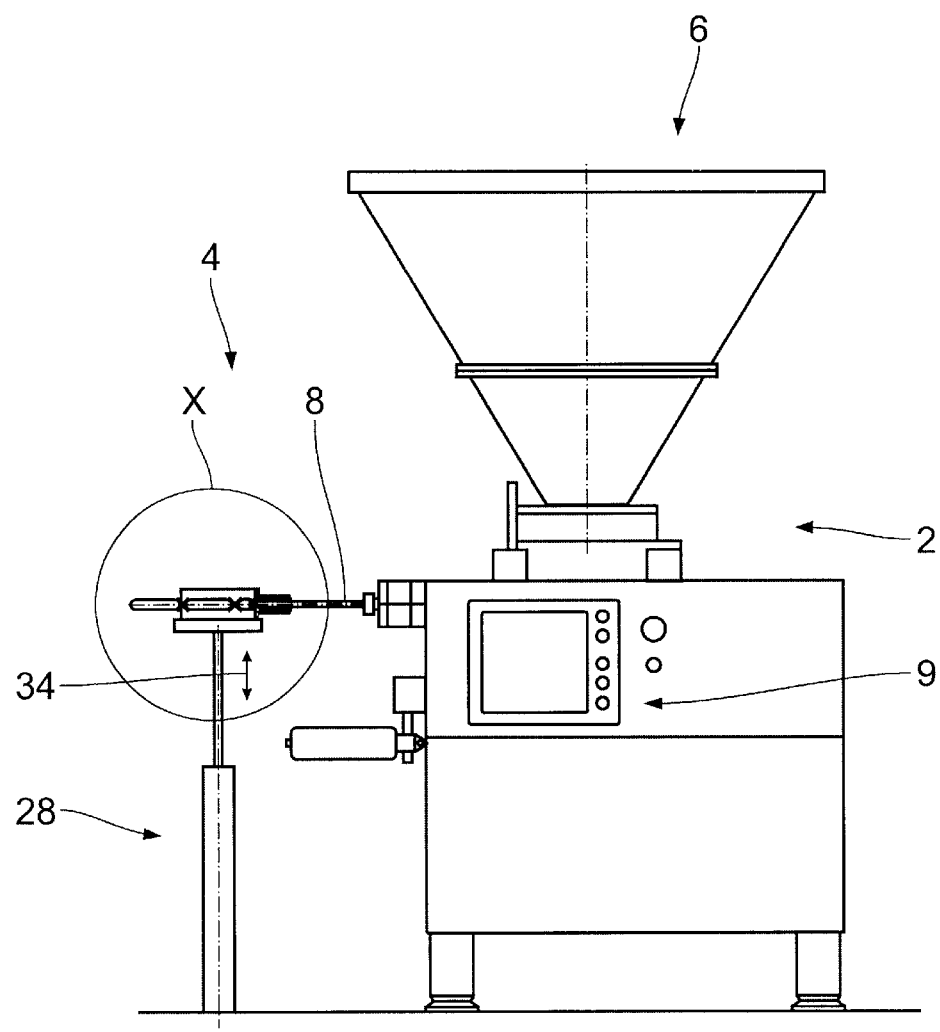

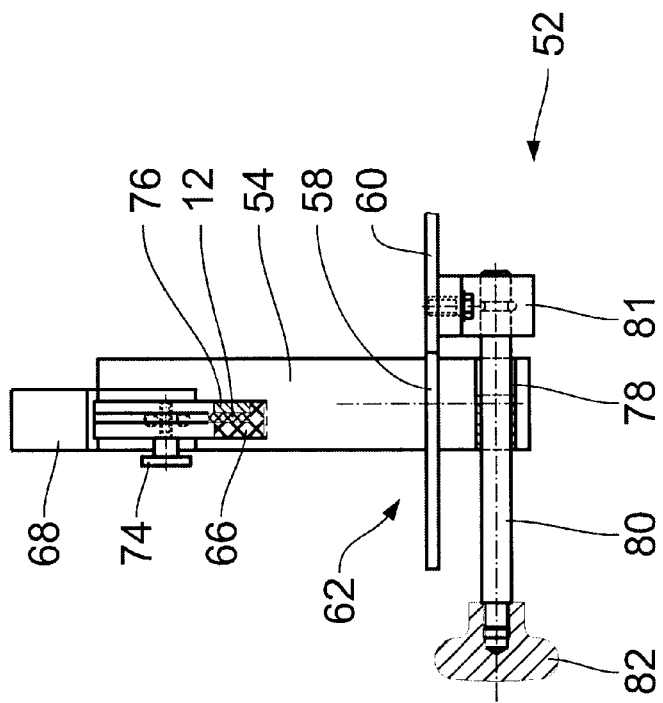
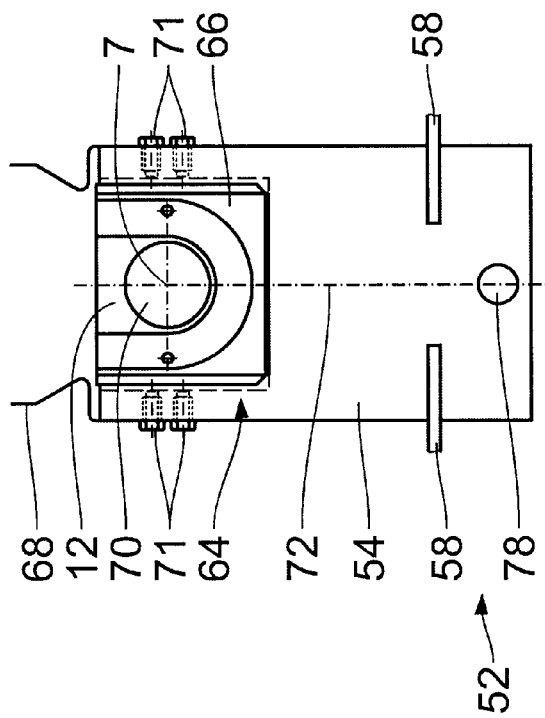
Fig. 7
Fig. 6

METHOD AND APPARATUS FOR THE PRODUCTION OF CHAIN-LIKE FOODSTUFFS SUCH AS SAUSAGES OR THE LIKE

The invention concerns a process for the production of chain-like or concatenated foodstuff products, such as sausages or the like, wherein a pasty filling material such as for example sausage meat is conveyed by means of a filling pump through a filling tube which is rotatable about its longitudinal axis, and introduced into a tubular case or skin which partially surrounds the filling tube, wherein the filled skin is fed to a portioning device having a plurality of dividing elements which are disposed in opposite paired relationship and which are movable synchronously together with the filled skin, and the filled skin is engaged by two dividing elements which are disposed in opposite paired relationship and acted upon by a clamping force, and wherein a rotational moment is applied to the skin by the filling tube by rotation of the filling tube so that the filled skin is caused to rotate at least in a portion between an exit opening of the filling tube and the portioning device and is locally prevented from rotating by application of the clamping force by the dividing elements, so that a twist-off location is produced, and wherein, at a location spaced from a twist-off location produced, a further twist-off location is produced on the filled skin, so that portioned sausages or the like are produced.

The invention further concerns an apparatus for the production of chain-like or concatenated foodstuff products, such as sausages or the like, comprising a filling pump for conveying a pasty filling material such as sausage meat, a filling tube which communicates with the filling pump and which is rotatable about its longitudinal axis and which at an end region has an exit opening for discharge of the filling material into a case or skin partially surrounding the filling tube and which is in engagement with the skin in such a way that a rotational moment is applied to the skin by the filling tube by rotation of the filling tube so that the filled skin is caused to rotate at least in a portion between an exit opening of the filling tube and the portioning device, and a portioning device having a plurality of synchronously movable dividing elements which are disposed in mutually opposite paired relationship and which apply a clamping force to the filled skin so that a defined twist-off location can be produced.

A process and an apparatus of that kind, which are known for example from German patent specification DE 23 02 297 can be used primarily to produce sausages but also other foodstuff products which are divided into portions. For the purposes of producing sausages which are divided into lengthwise portions, in accordance with DE 23 02 297, sausage meat is conveyed by means of a filling pump through a rotatable filling tube and introduced into a sausage skin. The skin which expands during the filling operation is simultaneously subjected to a pulling force by the portioning device and withdrawn from the filling tube. The dividing elements of the portioning device engage the filled skin and prevent it from rotating while at the same time the filled skin is continuously rotated by means of a rotational moment applied by the filling tube so that a twist-off location is produced in the region of the dividing elements which engage the filled skin. At a later time, after further conveying movement of the filled skin, a further spaced twist-off location is produced by means of the dividing elements of the portioning device, thereby producing a length-portioned sausage. The sausages which are connected together can then be transferred to a suspension device and can be subjected for example to a smoking procedure.

To apply a rotational moment to produce rotation of the filled sausage skin, the known apparatus has a so-called braking device with braking rollers which provide that the unfilled skin is pressed against the outside surface of the filling tube. The braking rollers enclose the filling tube in an annular array. The pressing force of the braking rollers must be specifically selected so that the skin on the one hand does not tear but on the other hand a certain level of resistance is opposed thereto. The apparatus suffers from the disadvantage that adjusting the pressing force of the braking rollers and applying an adequate rotational moment is difficult. The skin can tear when an excessive rotational moment and/or an excessive pressing force is applied by the braking rollers.

A further disadvantage of the known apparatus is that the braking device with the braking rollers is of a really complicated and expensive structure. In addition, the operation of pulling on the unfilled skin to prepare for the actual operation of filling it with sausage meat is very complicated and difficult. As the skin which is in a condition of being gathered together cannot be threaded through the braking arrangement which is closed in an annular configuration, the entire braking device either has to be completely pushed away axially from the filling tube, or it has to be pivoted away, which in operation however is also complicated in terms of structure. A particular problem in that respect is that the end of the filling tube is arranged relatively closely to the portioning device and there is thus little space available for pivoting the braking device away and also for manually threading in the sausage skin and pulling it on to the filling tube. The entire portioning device would possibly also have to be moved away. Moreover, in the case of a device which is referred to as a skin-placing device, it is really difficult and complicated to place the individual components consisting of the filling tube, the braking device and the portioning device in such a way that those components are readily accessible and can be quickly cleaned.

A particular aim in the production of sausages is for the individual sausages as far as possible to be of the same lengths and volumes, more specifically even when the sausage skins used involve fluctuations in diameter. Fluctuations in diameter or calibre of that kind occur particularly frequently in natural sausage skins. The attempt is made, by means of the filling machine and the portioning device, to introduce approximately the same volume of filling material into each sausage. Because of the fluctuations in calibre in that case sausages of different lengths may occur if the calibre within a group of calibre sizes differs sometimes upwardly or sometimes downwardly, so that the result is either a shorter sausage or a longer sausage. Manufacturers and consumers do not like to see that.

The object of the present invention is to provide a process and an apparatus for the production for sausages or other concatenated foodstuff products, which permit reliable production in portion-wise manner, which are simple to handle and which in particular permit the sausage case to be easily threaded on, while the apparatus is simple to clean. The invention further aims to provide that different sausage skins such as natural skins or artificial skins can be used while very substantially ensuring that sausages of equal length can be produced even when fluctuations in the calibre sizes of the skins occur.

In accordance with a first aspect, in a process of the kind set forth in the opening part of this specification, the invention attains that object in that the filling material flows into the skin radially at least partially through openings provided in the end region of the filling tube in the peripheral wall thereof and the diameter of the skin is increased in the end region of the filling tube by virtue of the at least partial radial flow thereinto.

Furthermore, in an apparatus of the kind set forth in the opening part of this specification, that object is attained in that the filling tube has in its end region in the peripheral wall at least one opening through which filling material flows into the skin radially and causes an increase in the diameter of the skin in the end region of the filling tube.

The advantages of the invention are essentially that the at least partially radial discharge flow of the filling material from the filling tube causes an increased rotational moment to be applied to the skin by the filling material as it issues, so that the skin is caused to rotate. By virtue of the configuration of the filling tube with openings in the end region, a rotational moment is additionally applied to the filling material which flows out of the filling tube through the openings, in particular by the filling tube wall portions which adjoin the openings, and thus the filling material is caused to rotate more vigorously than with conventional filling tubes. By virtue of the structure in accordance with the invention of the openings of the filling tube, which structure is possibly of an aerofoil-like shape, the filling material as it issues is additionally rotated and then a rotational moment is transmitted by the filling material to the inside of the filled natural skin which is of an enlarged diameter; the filled and enlarged (natural) skin is then twisted off at the location at which it is clamped off by means of the downstream-disposed portioning device, with the dividing elements which extend around the skin. During the procedure for filling the skin which is preferably a natural skin, the skin increases in size until it has approximately reached its nominal diameter. At the same time the natural skin is drawn off the filling tube, which is achieved on the one hand by virtue of the filling material which issues axially and radially from the filling tube and on the other hand by means of the portioning device which cooperates with the filled skin. The skin does not suffer a reduction in size, in spite of the application of a pulling force thereto by means of the portioning device, but—as stated—it is expanded. By virtue of the end region of the filling tube being provided with openings, this moreover affords a larger exit cross-section, in comparison with a conventional filling tube with a cylindrical exit opening, so that, under corresponding conditions in respect of pressure, a larger volume flow can issue, whereby the filling procedure can be speeded up. In the process according to the invention, the size of the openings is adapted to the volume flow of the filling material and the nominal diameter of the natural skin and thus the sausages to be produced, in such a way that the speed of transportation movement of the filled skin is constant. It can be provided that sausages with natural skin which are in the lower diameter range of their calibre size group are filled somewhat more fully than those which are in the upper diameter range of their calibre size group. It is to be emphasised that a rotational moment is applied to the skin by the sausage meat by virtue of the inter alia radial discharge flow of the filling material. Furthermore, the process according to the invention substantially ensures that sausages of equal lengths are produced, even if the skin involves fluctuations in calibre size thereof. The filling machine and the downstream-disposed portioning device with spaced dividing elements can ensure that substantially the same volume is always introduced into a portionable section of the sausage skin, which forms the sausage. In the event of fluctuations in calibre size, that is to say fluctuations in diameter, the sausages are then possibly only filled somewhat more or somewhat less fully, while the length remains substantially constant. In accordance with the invention, it is possible to deal with various kinds of skins such as the skins which are referred to as natural skins tubed on to foil or overlapped natural skins.

A preferred embodiment of the process provides that the filling material flows radially into the skin through a plurality of openings formed at equal spacings relative to each other in the peripheral region of the filling tube, as that provides for uniform filling and the uniform application of a rotational moment firstly to the filling material which issues radially from the filling tube through the openings thereof and then also to the skin by means of the filling material, and the exit cross-section is increased, by virtue of a plurality of openings.

An embodiment which is also preferred provides that the unfilled skin is pressed by a pressing element against the outside peripheral surface of the filling tube whereby a rotational moment is applied to cause rotation of the skin. That measure additionally applies a rotational moment to the skin while at the same time preventing a return flow of the filling material in opposite relationship to the direction of flow of the filling material in the filling tube. It is also possible to ensure that the sausages are filled in such a way as to be well-rounded, by means of the pressing element.

A development of the process according to the invention advantageously provides that a pulling force is applied to the sausage skin by the dividing elements of the portioning device and by the filling material which flows into the skin from the filling tube. Therefore, transportation of the filled skin is implemented on the one hand by the filling material which also flows partially axially out of the filling tube and which in that case produces an axially directed thrust force on the skin and additionally by virtue of the pulling force applied by the dividing elements of the portioning device, thereby overall providing for a uniform continuous conveying effect.

Preferably, the dividing elements of the portioning device are guided along a peripherally extending path of movement and the speed of the dividing elements is adjustable so that the degree to which the sausages are filled out can be influenced by adjustment and adaptation of the speed to the volume flow or mass flow of the filling material within certain limits.

In accordance with a development it is proposed that the speed of rotation of the filling tube is steplessly adjustable and the amount of filling material conveyed through the filling tube by the filling pump per unit of time is adjustable so that it is possible to implement individual adjustment.

In accordance with a development of the apparatus according to the invention it is provided that in the end region of the filling tube there are a plurality of recesses or notches which are uniformly spaced around the periphery of the filling tube and which extend axially. Alternatively, instead of the recesses or notches, the filling tube could also have bores, slots or the like, spaced from the end of the filling tube. The uniform spacing of the recesses—or bores or slots—makes it possible to provide for a uniform increase in the diameter of the sausage skin.

Preferably the filling tube is designed in such a way that the recesses have a mouth portion which narrows within an increasing distance from the end of the filling tube, and a substantially circular or elliptical portion adjoining the mouth portion. In that way it is possible to achieve a relatively large flow cross-section.

In an apparatus of the kind set forth in the opening part of this specification having a pressing element embracing the filling tube for pressing the unfilled skin against the outside peripheral surface of the filling tube, the object of the invention is further attained in that the pressing element has at least one slot which extends substantially radially outwardly from a central aperture for receiving the filling tube.

The advantages of a pressing element having an insertion slot are in particular that the pressing element can no longer be pushed on to the filling tube or removed only by an axial movement, but in accordance with the invention can be fitted on to the filling tube or removed from the filling tube radially, in which case then the filling tube is passed through the slot and placed in or taken out of the central aperture. When the pressing element is fitted it so-to-speak 'snaps' over the filling tube. That also means that the leading end of a sausage skin which is in a gathered-together condition no longer has to be threaded through a pressing element, which is a complicated and expensive procedure, but instead, after the skin in the gathered-together condition has been threaded on, the twisting-off element is simply pushed radially over the skin. In accordance with the invention, this eliminates displacement of a braking device or the need for pivoting the braking device away, which is the case in the state of the art.

Particularly in an apparatus according to the invention with a lift device for selectively raising and lowering the pressing element between an operative position and a rest position, wherein the filling tube is moved through the slot of the pressing element during the raising and lowering movement of the pressing element, the above-described advantages of a divided or slotted pressing element are particularly relevant, as then the pressing element is movable into the operative position and the rest position respectively automatically by means of the lift device, without axial movement thereof on to the filling tube then being required.

A development of the pressing element according to the invention provides that it comprises an elastic material, and has a substantially annular lip portion which presses the skin against the filling tube and a slot portion containing the slot, the width of the slot being less than the outside diameter of the filling tube.

Preferably the pressing element is releasably secured to a holding and guide device so that it is securely positioned and guided. It is particularly preferred in that respect if the holding and guide device has a frame and a holding element which is arranged thereon and which carries the pressing element, and the holding element is arranged with play movably on the frame. By virtue of the movable arrangement with play or tolerance, the pressing element in operation positions itself so-to-speak automatically relative to the filling tube so that there is no longer any need for an expensive procedure for adjusting and fixing the pressing element. Desirably the holding element is movable in a plane arranged perpendicularly to the longitudinal axis of the filling tube while at the same time it is arranged in a defined axial position—relative to the filling tube. The holding element can simply be fitted into the holding and guide device, preferably being pushed into same. For that purpose the holding element is of a substantially rectangular external contour and has an insertion slot which leads from the inside outwardly, for introducing the pressing element.

Particularly simple axial positionability is afforded if the frame of the holding and guide device is displaceable in the direction of the longitudinal axis of the filling tube and can be fixed in a plurality of positions. Displaceability and fixability can be implemented in a particularly simple fashion from the point of view of structure if the frame is axially slidably mounted and has a female screwthread which is in engagement with a rotatable screwthreaded spindle and which is movable by rotation of the screwthreaded spindle. The pitch of the screwthreaded spindle gives a kind of self-locking action. The holding and guide device is preferably arranged on a lift table which can be raised and lowered.

In an apparatus as described in the opening part of this specification, the object of the present invention is further achieved by a lift device for selectively raising and lowering the portioning device between an operative position and a rest position. Handling of the apparatus can be considerably simplified by virtue of the fact that the portioning device can be raised and lowered. In the rest position in which the portioning device is lowered relative to the longitudinal axis of the filling tube, a sausage skin can be pushed on to the filling tube in a particularly simple manner without the portioning device causing any problem in that respect. The same applies in regard to the pressing element which in a preferred embodiment can also be raised and lowered. Furthermore, this can provide for cleaning of the filling tube being a simple procedure. After a sausage skin is threaded on to the filling tube, the portioning device is moved into the operative position so that it is aligned relative to the longitudinal axis of the filling tube. Preferably the longitudinal axis of the filling tube is disposed in the region between two peripherally extending band elements which carry the dividing elements of the portioning device so that after the filling operation the filled skin passes along a substantially rectilinear path of movement and is thus fed to the portioning device over a very short travel distance.

A particularly preferred embodiment of the apparatus according to the invention provides that the portioning device and the pressing element can be raised and lowered together by means of a single common lift device. That considerably reduces the structural complication and expenditure. The pressing element which is preferably secured to a holding and guide device is movable together with the portioning device completely into a rest position and the operative position respectively. It will be appreciated that the lift device can also be arranged in such a way that the portioning device and possibly the pressing element are movable in a substantially horizontal plane or an inclinedly disposed plane. In that case the slot in the pressing element would extend in a manner corresponding to the inclination of the plane. Preferably the lift device involves a straight path of movement.

In a development of the apparatus according to the invention, it is proposed that the portioning device has two oppositely disposed rotating conveyor elements which are arranged adjacent to the path of movement of the filled skin and the dividing elements are secured to the conveyor elements. Preferably two oppositely disposed dividing elements are arranged in mutually angularly displaced relationship so that interengagement of the dividing elements reliably provides that in the region of engagement of the dividing elements the filled skin is prevented from rotating and is clamped off so that a twist-off location is produced at the place where it is wanted.

Figure 2:
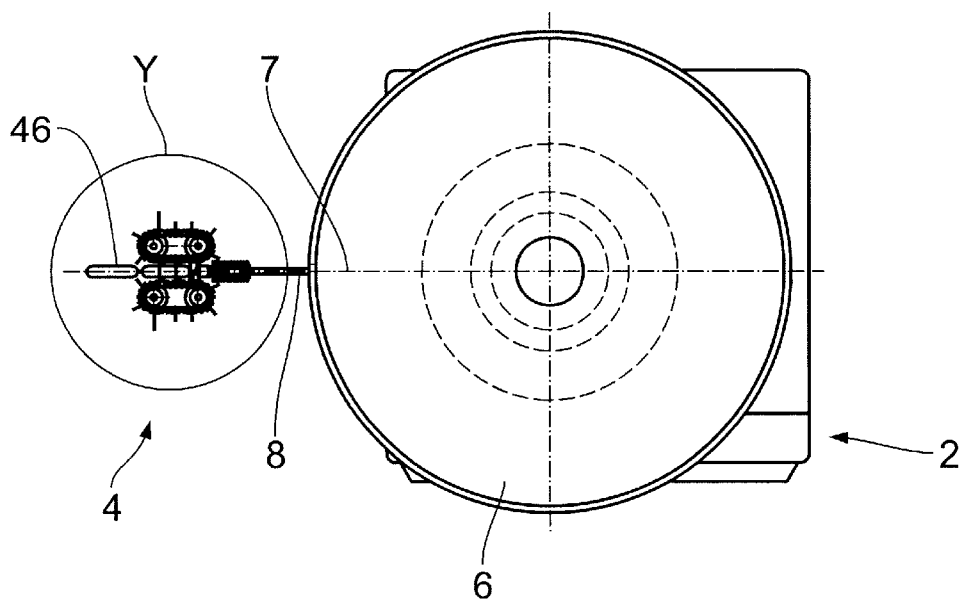
Figure 3:
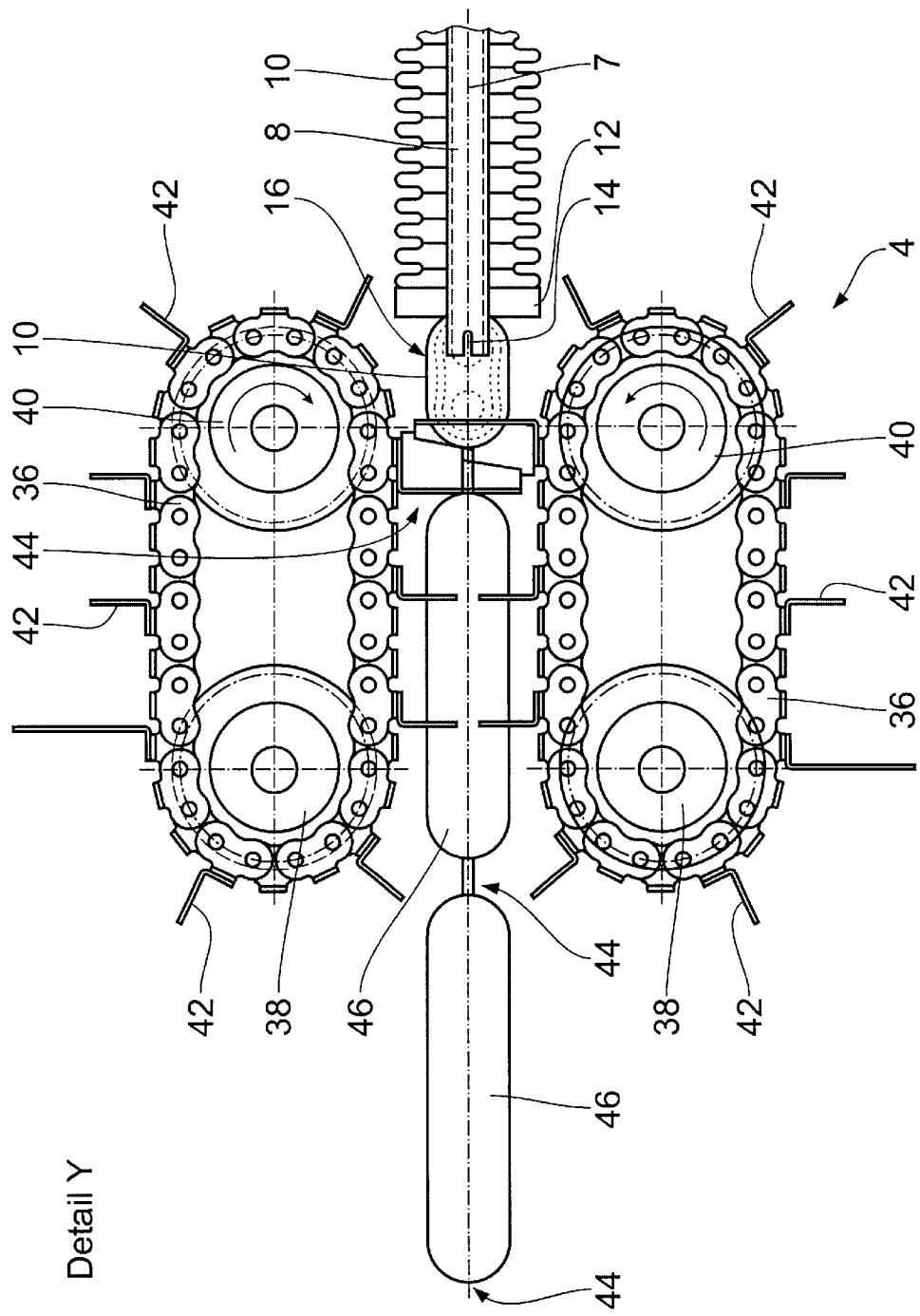
Figure 4:
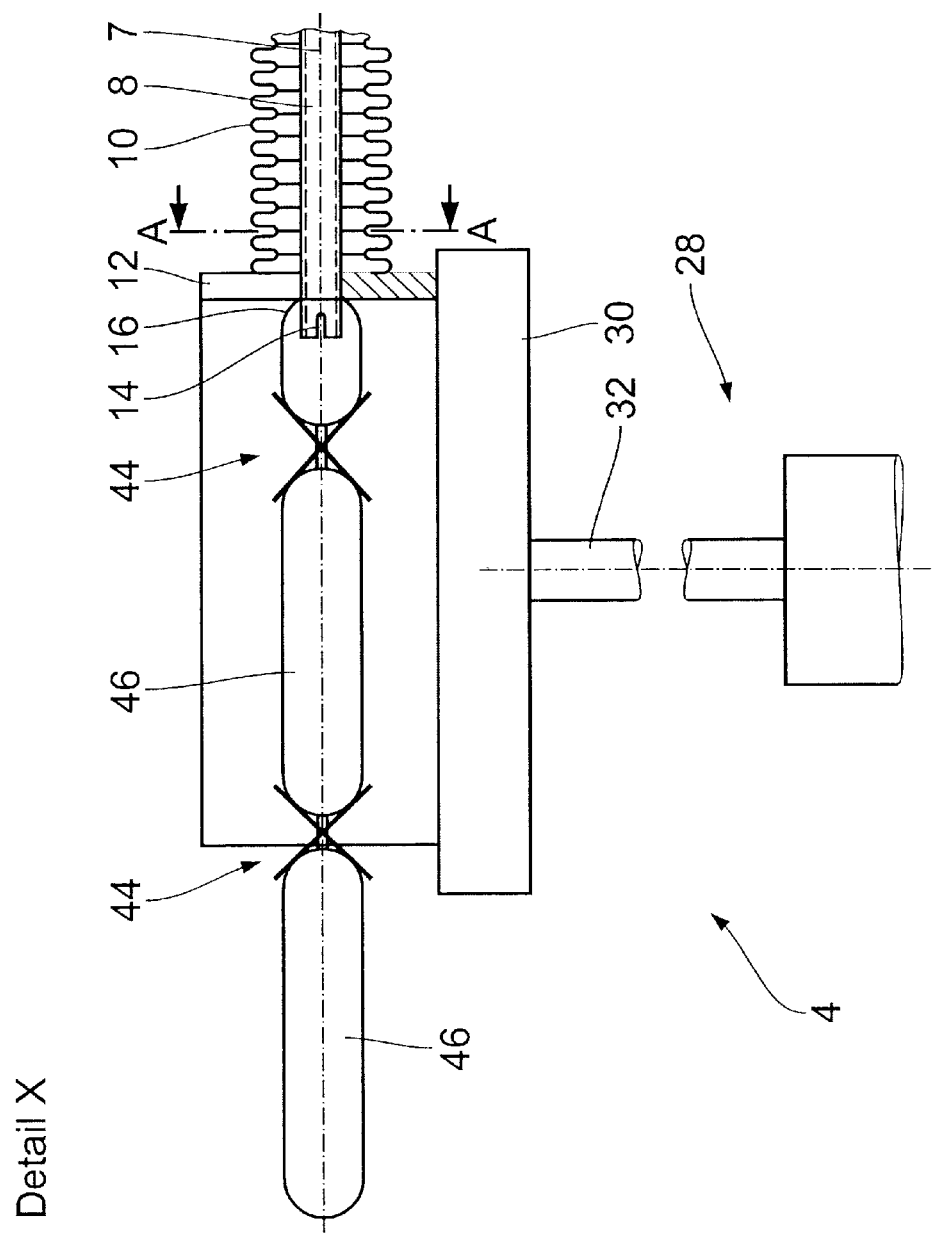
Figure 5:
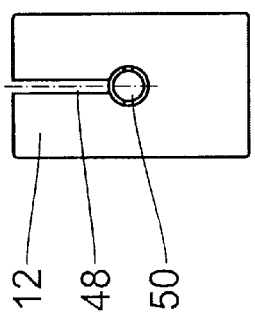
Figure 8:
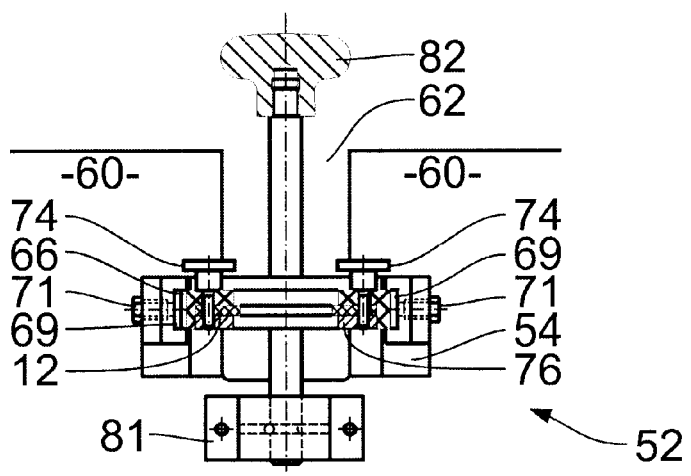
Figure 9:
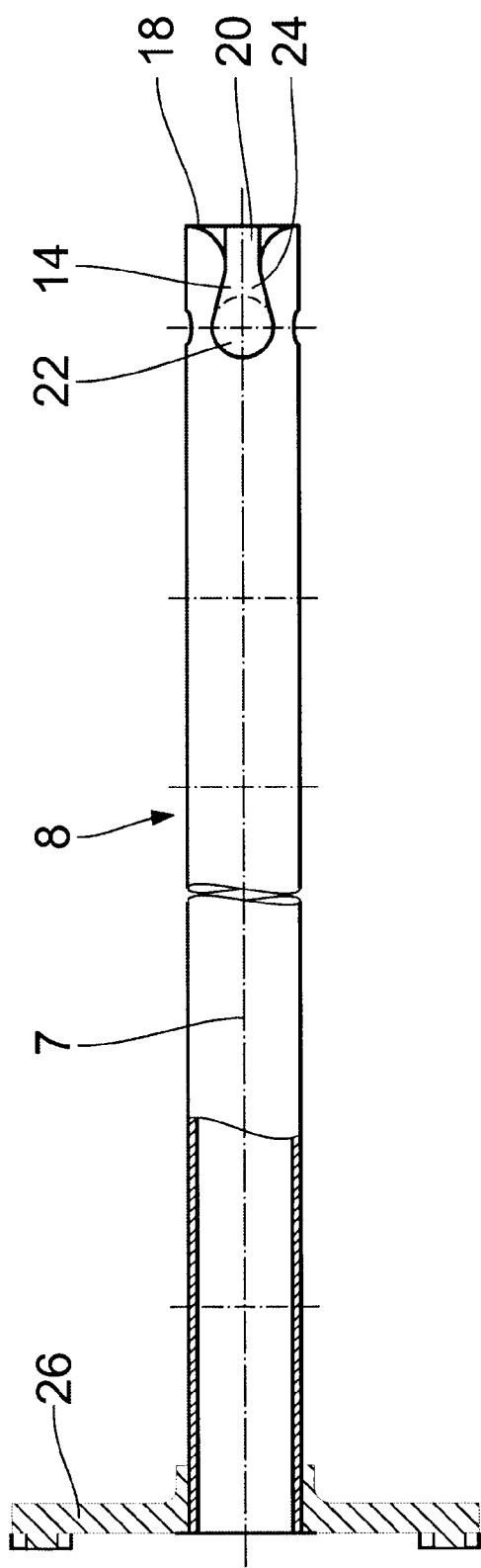

The invention is described hereinafter by means of embodiments with reference to the accompanying drawings in which:

FIG. 1 is a side view of an apparatus according to the invention for producing lengthwise-portioned sausages, FIG. 2 is a plan view of the apparatus of FIG. 1, FIG. 3 is a plan view of a part of the apparatus according to the invention shown on an enlarged scale, as identified by Y in FIG. 2, FIG. 4 is a side view of a portion of the apparatus according to the invention, as identified by X in FIG. 1, FIG. 5 is a side view of a pressing element on line AA, FIG. 6 is a side view of an alternative embodiment with a holding and guide device according to the invention for a pressing element having a slot, FIG. 7 is a partly sectional view of the holding and guide device shown in FIG. 6, FIG. 8 is a plan view of the holding and guide device shown in FIG. 6, and FIG. 9 is a partly sectional view of a filling tube according to the invention with recesses in the end region.

The apparatus shown in a side view in FIG. 1 serves for the production of lengthwise-portioned sausages and comprises a substantially conventional filling machine 2 and a portioning device 4 which is coupled thereto. The filling machine 2 has a hopper 6 for the feed of sausage meat, a filling pump coupled to the hopper 6 and a filling tube 8 which is drivable and rotatable continuously or intermittently about its longitudinal axis 7, through which the sausage meat is conveyed. To control the filling machine 2, the portioning device 4 and a suspension device (not shown) which is disposed downstream of the portioning device 4 the system has an operating panel 9 connected to a control and regulating device. The speed of rotation of the filling tube is steplessly adjustable, like the amount of sausage meat conveyed through the filling tube 8 by the filling pump per unit of time.

As can be seen from FIGS. 3 and 4, the filling tube 8 is surrounded over a portion thereof by a sausage skin or case 10 which is in a gathered-together or concertinaed condition and which can involve natural skin or artificial skin. Arranged adjacent to the gathered-together portion of the skin 10 'on the filling tube' 8 is a pressing element 12 which is diagrammatically shown in FIG. 3 and shown in detail in FIGS. 6 to 8, for pressing the skin 10 against the outside surface of the cylindrical filling tube 8 and to ensure in operation that a rotational moment is transmitted by the rotating filling tube 8 to the skin 10.

In its wall, in the end region, the filling tube 8 has a plurality of openings 14 through which the sausage meat under pressure can issue with a radial flow component and flow radially into the skin 10. As a result, in the region 16, see in particular FIG. 3, that is to say in the portion between the pressing element 12 and the distal end of the filling tube 8, the diameter of the skin 10 is increased by virtue of sausage meat flowing into same. The arrangement has a plurality of openings 14 which are arranged uniformly at the periphery of the filling tube 8, in the form of slot-like recesses or notches which are of a substantially constant width. It would however also be possible to provide slots, through bores or the like of other configurations to permit sausage meat to flow out radially.

FIG. 9 shows an alternative embodiment of a filling tube. That arrangement has four openings 14 distributed around the periphery, in the form of recesses or notches which each have a mouth portion 20 which narrows with increasing distance from the end 18 of the filling tube 8, and a substantially circular portion 22 which adjoins the mouth portion 20 and which could also be elliptical or the like. Between the mouth portion 20 and the portion 22 there is a transitional region 24 of a cross-section which increases in a direction towards the circular portion 22. At the end region opposite to the end 18, a connection flange 26 is welded to the cylindrical tube portion, with which the filling tube 8 is releasably secured to a rotary drive (not shown) of the filling machine 2 (FIG. 1).

The portioning device 4, like the pressing element 12, is movable up and down by means of a lift device 28 diagrammatically shown in FIG. 4, from an operative position as illustrated into a rest position in which the portioning device 4 and the pressing element 12 are arranged vertically markedly spaced from the longitudinal axis 7 of the filling tube 8 so that the latter is freely accessible. The lift device 28 has a lift table 30 or a frame 60, see FIG. 7, which is coupled to one or more bars 32 which are reciprocatable with a translatory movement. The bars 32 are displaceable for example pneumatically or hydraulically and coupled to a piston movable in a cylinder, in which respect the cylinder chamber can be filled with gas or hydraulic fluid. Alternatively the bars 32 could be in the form of screwthreaded spindles which are in engagement with screwthreaded sleeves driven by electric motor means, and are thus movable up and down with a translatory movement. As indicated by the arrow 34 in FIG. 1, the complete portioning device 4 and the pressing element 12 are movable vertically. It is however also possible for the portioning device 4 to be movable from an operative position into a rest position horizontally or along an inclinedly arranged plane, by means of a horizontally or inclinedly disposed lift device.

As can be seen from FIG. 3 the portioning device 4 has two oppositely disposed, circulating conveyor elements which are arranged adjacent to the path of movement of the filled sausage skin 10, in the form of endless chains 36 which are each fitted around two respective pinions 38, 40. The pinions 40 are connected to an electric drive motor or each connected to a respective electric drive motor for synchronously moving the chains 36. Secured at equal spacings from each other on the chains 36 are dividing elements 42 which are each disposed in mutually opposite paired relationship and which apply a clamping force to the filled skin 10. The dividing elements 42 are preferably arranged inclinedly relative to each other and have a V-shaped recess which receives and clamps the filled skin therein. They are arranged in displaced angular relationship with each other. The dividing elements 42 apply a clamping force to the filled skin 10 so that it is locally prevented from rotating so that a twist-off location 44 is produced. Individual sausages 46 of equal lengths are produced by the formation of a plurality of spaced twist-off locations 44. The speed of rotation of the pinions 40 is adjustable so that the speed of the dividing elements 42 is also adjustable and can be adapted to the speed of the filled sausage skin 10.

As FIG. 5 shows the pressing element 12 has a slot 48 which extends substantially radially outwardly from a central cylindrical aperture for receiving the filling tube 8 so that the filling tube 8 can be introduced into the aperture 50 from the outside through the slot 48.

While FIGS. 4 and 5 show a simple pressing element 12, FIGS. 6 to 8 show an alternative embodiment of a pressing element 12 which is held and positioned in a holding and guide device 52. The holding and guide device 52 includes a metal frame 54 which is mounted on a housing 60 or a lift table (see reference numeral 30 in FIG. 4) of a lift device 28 and which is of substantially cuboidal configuration and which in the lower region has two mutually opposite slots 58 in which portions 22 of the housing 60 of the lift device are arranged to support the frame 54, see FIGS. 7 and 8. The housing 60 has a wide slot 62. The portion 22 of the frame 54, which is between the slots 58, is axially movable in the slot 62.

A substantially square holding element 66 is inserted in a rectangular opening 64 disposed in the upper region of the frame 54 and fixed in the inserted condition by means of resilient sheet metal strips 68 which have a nose portion and which engage with their nose portion behind the holding element 66 but which can be simply manually bent back in order to remove the holding element 66. The sheet metal strips 68 are secured to the frame 54 by means of screws 71. Two substantially U-shaped grooves 69 are provided in the frame 54 for lateral guidance of the holding element 66 which can be inserted into the grooves 69 with the sides of the holding element 66.

A pressing element 12 comprising a resilient material is clamped in position, the pressing element 12 having a central cylindrical aperture 70 and a slot 72 which leads outwardly from the aperture 72 and through which the filling tube 8 can be guided into and out of the aperture 70. In operation, the pressing element 12 is in contact with the outside surface of the skin 10 and causes the skin 10 to be pressed against the outside surface of the filling tube 8. In that way, a rotational moment is transmitted from the filling tube to the skin 10. In the illustrated embodiment the slot 72 extends radially but it could also be of other shapes or configurations.

The pressing element 12 is releasably secured to the holding element 66 by means of a clamping plate 76 which can be clamped by means of two knurled screws 77 relative to the holding element 66. It is to be emphasised that, in accordance with the invention, the holding element 66 is placed with a play or tolerance in the frame 54 so that the pressing element 12 positions itself 'automatically' relative to the filling tube 8 so that it is possible to avoid complicated and expensive precise adjustment and fixing of the pressing element 12 and the holding element 66.

Provided beneath the housing 60 in the frame 54 is a screwthreaded bore 78 which is in engagement with a male screwthread formed on a screwthreaded spindle 80. The screwthreaded spindle 80 is rotatably supported by an end portion thereof at a mounting 81 screwed to the housing 60, and fixed to the other end of the screwthreaded spindle is a rotary actuating knob 82 with which the screwthreaded spindle 80 can be rotated manually about the longitudinal axis 7. When the spindle 80 is rotated, the frame 54 is displaced with a translatory movement in dependence on the direction of rotation of the spindle 80—towards the left or the right in FIG. 7—in the direction of the longitudinal axis 7 of the screwthreaded spindle 80 and in the direction of the longitudinal axis 7 of the filling tube 8, so that the pressing element 12 can be moved precisely into a desired position on the filling tube 8 and is fixed in a desired position by virtue of the self-locking action of the screwthreaded bore 78 and the screwthreaded spindle 80.

The mode of operation of the apparatus according to the invention and the process is described hereinafter:

Before production of the sausages 46 is effected, the portioning device 4 together with the pressing element 12 is firstly moved downwardly into the rest position (FIG. 1 or FIG. 4) so that the filling tube 8 is freely accessible. Then, a sausage skin 10 in the gathered-together condition is axially pushed on to the filling tube 8 and partially drawn off with its end portion in the condition of no longer being gathered together, beyond the distal end 18 of the filling tube 8. The portioning device 4 and the pressing element 12—possibly with the holding and guide device 52 described with reference to FIGS. 6 to 8—are moved vertically upwardly into the operative position by means of the lift device 28. In that position, the pressing element 12 completely embraces the filling tube 8 and presses the skin 10 against the filling tube 8.

The pump of the filling machine 2 can now be switched on so that sausage meat flows through the filling tube 8 and by virtue of an axial and radial flow through the openings 14, it flows into the interior of the skin 10 (reference 16 in FIG. 3) and the skin 10 is filled with sausage meat. At the same time as the filling pump is switched on, the portioning device 4 is switched on so that the dividing elements 42 together with the chain 36 are moved in portion-wise manner synchronously with respect to the filled skin 10 and in that procedure come locally into engagement with the filled skin 10 and apply thereto a clamping force so that the filled skin 10 is prevented from rotating there, so that the rotary movement of the rest of the filled skin 10 between the dividing elements 42 and the end region of the filling tube 8 causes the rotating filled skin 10 to be twisted off. The filled skin 10 is then transported by means of the portioning device further along a substantially rectilinear path of movement—towards the left in FIG. 3—until further dividing elements 42 again act on the filled skin 10 and produce a further twisted-off location. That procedure is repeated a plurality of times with the result of forming a chain of interconnected sausages 46 which can be suspended manually or by a conventional suspension device (not shown) and removed.

When the sausage skin 10 is completely filled and no portion 22 of gathered-together skin 10 or only a small portion 22 of gathered-together skin 10 is arranged on the filling tube 8, the filling pump and the portioning device 4 are switched off and moved downwardly from the operative position into the rest position. The above-described procedure can then be repeated.

What is claimed is:

1. A process for the production of chain-like foodstuff products comprising:

pumping a pasty filling material through a filling tube which is rotatable about its longitudinal axis, and introducing the filling material into a tubular skin which partially surrounds the filling tube, feeding the filled skin to a portioning device having a plurality of dividing elements which are disposed in opposite paired relationship and which are movable synchronously together with the filled skin, engaging the filled skin by two of the dividing elements which are disposed in opposite paired relationship and acted upon by a clamping force, and applying a torque to the skin by rotating the filling tube at least in a portion between an exit opening of the filling tube and the portioning device and locally preventing the filled skin from rotating by application of the clamping force by the dividing elements, so that a first twist-off location is produced, and at a location spaced from the first.twist-off location, producing a further twist-off location on the filled skin, to produce portioned sausages, wherein the filling material flows into the skin radially at least partially through openings provided in an end region of the filling tube and the diameter of the skin is increased in the end region of the filling tube by virtue of the at least partial radial flow into same.

2. A process according to claim 1, wherein the filling material flows radially into the skin through a plurality of openings provided at equal spacings relative to each other in the end region of the filling tube.

3. A process according to claim 1, wherein the unfilled skin is pressed by a pressing element against an outside peripheral surface of the filling tube and the torque is thereby applied to cause rotation of the skin.

4. A process according to claim 1, wherein a pulling force is applied to the skin by the dividing elements of the portioning device and by the filling material flowing into the skin from the filling tube.

5. A process according to claim 1, wherein the dividing elements of the portioning device are guided along a circulating path of movement and the speed of the dividing elements is adjustable.

6. A process according to claim 1, wherein the speed of rotation of the filling tube is steplessly adjustable and the amount of filling material conveyed through the filling tube per unit of time is adjustable.

7. Apparatus for the production of chain-like foodstuff products comprising a filling pump for conveying a pasty filling material, a filling tube which communicates with the filling pump and which is rotatable about its longitudinal axis and which at an end region thereof has an exit opening for discharge of the filling material into a skin partially surrounding the filling tube and which is configured for engagement with the skin in such a way that a rotational moment is applied to the skin by the filling tube by rotation of the filling tube so that the filled skin is caused to rotate at least in a portion beyond the exit opening of the filling tube, and a portioning device having a plurality of synchronously movable dividing elements which are disposed in mutually opposite paired relationship and which apply a clamping force to the filled skin so that a defined twist-off location can be produced, wherein the filling tube has an end region with at least one opening through which filling material flows radially into the skin and causes an increase in the diameter of the skin in the end region of the filling tube.

8. Apparatus according to claim 7, wherein a plurality of axially extending recesses which are spaced uniformly about the periphery of the filling tube are provided in the end region of the filling tube.

9. Apparatus according to claim 8, wherein the recesses have a mouth portion which narrows with increasing spacing from an end of the filling tube and a substantially circular or elliptical portion adjoining the mouth portion.

10. Apparatus according to claim 7 comprising a pressing element embracing the filling tube for pressing the unfilled skin against the outside peripheral surface of the filling tube, wherein the pressing element has a central aperture and at least one slot which extends substantially radially outwardly from the central aperture for receiving the filling tube.

11. Apparatus according to claim 10, wherein the pressing element comprises an elastic material, and has a substantially annular lip portion which presses the skin against the filling tube and a slot portion containing the slot, the width of the slot being less than the outside diameter of the filling tube.

12. Apparatus according to claim 10, wherein the pressing element is releasably secured to a holding and guide device.

13. Apparatus according to claim 12, wherein the holding and guide device has a frame and a holding element which is arranged on the frame and which receives the pressing element and the holding element is arranged movably with a play on the frame.

14. Apparatus according to claim 13, wherein the holding element is movable in a plane arranged perpendicularly to the longitudinal axis of the filling tube.

15. Apparatus according to claim 13, wherein the holding element is of a substantially rectangular external contour and has an insertion slot which leads from the inside outwardly for introduction of the pressing element.

16. Apparatus according to claim 13, wherein the frame of the holding and guide device is displaceable in the direction of the longitudinal axis of the filling tube and can be fixed in a plurality of locations.

17. Apparatus according to claim 16, wherein the frame is axially slidably mounted and has a female screwthread which is in engagement with a rotatable screwthreaded spindle and is movable by rotation of the screwthreaded spindle.

18. Apparatus according to claim 10, further comprising a lift device for selectively raising and lowering the pressing element between an operative position and a rest position wherein during the raising and lowering movement of the pressing element the filling tube is moved through the slot of the pressing element.

19. Apparatus according to claim 12, wherein the holding and guide device is arranged on a lift table which can be raised and lowered.

20. Apparatus according to claim 7, further comprising a lift device for selectively raising and lowering the portioning device between an operative position and a rest position.

21. Apparatus according to claim 18, wherein the portioning device and the pressing element can be raised and lowered together by means of the lift device.

22. Apparatus according to claim 1, wherein the portioning device has two oppositely disposed circulating conveyor elements configured to be arranged adjacent to the path of movement of the filled skin and the dividing elements are secured to the conveyor elements.

23. Apparatus according to claim 1, wherein two oppositely disposed dividing elements are arranged in angularly mutually displaced relationship.

* * * * *